United States Patent
Yañez Villarreal

(10) Patent No.: US 9,856,854 B2
(45) Date of Patent: *Jan. 2, 2018

(54) VORTEX RESONANCE WIND TURBINE

(71) Applicant: DEUTECNO, S.L., Madrid (ES)

(72) Inventor: David Jesus Yañez Villarreal, Avila (ES)

(73) Assignee: DEUTECNO, S.L., Madrid (ES)

( * ) Notice: Subject to any disclaimer, the term of this patent is extended or adjusted under 35 U.S.C. 154(b) by 0 days.

This patent is subject to a terminal disclaimer.

(21) Appl. No.: 15/241,807

(22) Filed: Aug. 19, 2016

(65) Prior Publication Data

US 2016/0356264 A1    Dec. 8, 2016

Related U.S. Application Data

(63) Continuation of application No. 13/811,788, filed as application No. PCT/ES2011/000252 on Aug. 1, 2011, now Pat. No. 9,444,372.

(30) Foreign Application Priority Data

Aug. 2, 2010   (ES) .................................. 201001003

(51) Int. Cl.
*H02N 2/18*   (2006.01)
*F03D 5/06*   (2006.01)
(Continued)

(52) U.S. Cl.
CPC .................. *F03D 5/06* (2013.01); *F03D 9/25* (2016.05); *H02N 2/188* (2013.01); *F03G 7/08* (2013.01);
(Continued)

(58) Field of Classification Search
CPC .............. F03D 5/06; F03D 9/25; H02N 2/188
(Continued)

(56) References Cited

U.S. PATENT DOCUMENTS

| | | | | |
|---|---|---|---|---|
| 3,970,877 A | * | 7/1976 | Russell | .................. E21B 21/08 |
| | | | | 175/40 |
| 3,972,232 A | * | 8/1976 | Miller | .................. G01F 1/3218 |
| | | | | 73/861.24 |

(Continued)

FOREIGN PATENT DOCUMENTS

| | | |
|---|---|---|
| CN | 201818437 U | 5/2011 |
| EP | 2602483 A1 | 6/2013 |

(Continued)

OTHER PUBLICATIONS

Extended European search report including the European search opinion issued for corresponding European Patent Application No. EP11814138.1 dated Dec. 7, 2016.

(Continued)

*Primary Examiner* — Thomas Dougherty
*Assistant Examiner* — Karen B Addison
(74) *Attorney, Agent, or Firm* — Myers Wolin, LLC

(57) ABSTRACT

Wind turbine consisting of an anchoring to the ground or to a base and a mast, the natural oscillation frequency of which is purposely adjusted to the frequency of appearance of the air vortices or eddies produced after the collision of a laminar and stationary airflow against the surface thereof. The aeroelastic energy thus absorbed is converted into electrical energy due to the use of materials with high electromechanical coupling.

20 Claims, 3 Drawing Sheets

(51) Int. Cl.
*F03D 9/25* (2016.01)
*F03G 7/08* (2006.01)

(52) U.S. Cl.
CPC ... *F05B 2220/706* (2013.01); *F05B 2240/122* (2013.01); *F05B 2260/407* (2013.01); *Y02E 10/70* (2013.01); *Y02E 10/725* (2013.01)

(58) Field of Classification Search
USPC .......................................... 310/339; 290/43
IPC ............................ F03D 5/06,9/00; H02N 2/18
See application file for complete search history.

(56) References Cited

U.S. PATENT DOCUMENTS

| | | | |
|---|---|---|---|
| 7,633,175 B1* | 12/2009 | Wilson, III | F01D 9/041 290/43 |
| 9,444,372 B2* | 9/2016 | Yanez Villarreal | F03D 5/06 |
| 2005/0230973 A1 | 10/2005 | Fripp et al. | |
| 2006/0064972 A1 | 3/2006 | Allen | |
| 2008/0048455 A1* | 2/2008 | Carney | F03D 5/00 290/54 |
| 2012/0017852 A1* | 1/2012 | Geelhart | F22G 5/123 122/487 |

FOREIGN PATENT DOCUMENTS

| | | |
|---|---|---|
| FR | 2922607 A1 | 4/2009 |
| JP | 2001157433 A | 6/2001 |
| JP | 2006132397 A | 5/2006 |
| JP | 2006158113 A | 6/2006 |
| JP | 2006226221 A | 8/2006 |
| JP | 2012151982 A | 8/2012 |
| JP | 2012151985 A | 8/2012 |
| WO | 2010043617 A2 | 4/2010 |
| WO | 2012017106 A1 | 2/2012 |
| WO | 2012066550 A1 | 5/2012 |

OTHER PUBLICATIONS

International Search Report with Written Opinion, dated Dec. 27, 2011, for corresponding international application PCT/ES2011/000252.
International Preliminary Report on Patentability including the written opinion of the International Searching Authority for International Application No. PCT/ES2011/000252 dated Feb. 5, 2013.
International Search Report with Written Opinion, dated Apr. 7, 2014, for corresponding international application PCT/EP2014/054194.
Hoonhee et al., "Stabilization of a 1/3-order subharmonic resonance using non-linear dynamic vibration absorber", Nonlinear Dyn (2010), 59; 747-758.
Non-Final Office Action, dated Feb. 4, 2015, for corresponding parent U.S. Appl. No. 13/811,788.
Final Office Action, dated Sep. 24, 2015, for corresponding parent U.S. Appl. No. 13/811,788.

* cited by examiner

VORTEX RESONANCE WIND TURBINE

CROSS REFERENCE TO RELATED APPLICATIONS

This application is a continuation application of U.S. application Ser. No. 13/811,788, filed Jan. 23, 2013, which is a national stage application under 35 U.S.C. §371 of PCT/ES2011/000252, filed Aug. 1, 2011, which claims priority to Spanish Patent Application P201001003, filed Aug. 2, 2010, the contents of each of which are incorporated by reference herein.

OBJECT OF THE INVENTION

The present invention relates to a new instrument for generating electrical energy.

The object of the invention consists of a generating device belonging to the renewable energy industry, transforming wind energy into usable electric potential. Its design integrates three known physical principles: structural coupling to the natural frequency of oscillation, the generation of vortices in fluids, and the electromechanical coupling of some materials, for example due to the ferroelectric effect or the piezoelectric effect.

The novelty of this system resides in the coordinated integration of these three principles in an electrical energy generation device that tunes its natural oscillation frequency to the generation frequency of vortices that are generated in a synchronised manner throughout the structure.

BACKGROUND OF THE INVENTION

One of the most widespread forms of renewable energy is wind power, which relies on wind as the primary energy source.

The devices most commonly used to transform wind energy into electricity are multi-blade wind turbines. Despite the clear and undeniable technological improvements continuously achieved, these systems suffer from four fundamental drawbacks:

a) As they have mechanical components, gears, coils, etc. they have maintenance costs due to consumption of lubricants, part wear, heat degradation of insulating resins and other effects related to friction, heating due to friction, etc.

b) Conventional multi-blade wind turbines, based on theoretical work performed by Betz in 1927, increase their efficiency the higher the rotation speed of the rotors. This, in conjunction with the fact that the amount of energy available in a circular surface increases with the square of the blade length, means that the speed at the tips of the blades is very high, representing a high risk to avian fauna, with numerous accidents having been recorded.

c) The deliberate increase in size translates into a substantial increase in the complexity of its assembly, increasing initial installation costs.

d) The subjective visual impact of wind turbines can be described in many ways, but in any case their presence is accentuated by their wide range of motion.

In order to improve these aspects, the present invention describes a device based on three physical principals or fundamentals. These principles are widely used separately in the industry:

The first principle is electromechanical coupling. This effect is exhibited by certain materials in which when a force is applied between two of their faces a potential difference is created between them. As with any electrical machine, its operation is reversible and the presence of a voltage between two of its faces causes a deformation. Among these materials are ferroelectric materials (such as lead zirconate titanate and its derivatives) and piezoelectric materials (certain crystals such as quartz, etc.).

Materials with some type of electromechanical coupling have a wide range of applications as actuators (positioners, motors), speakers (introducing electrical energy and obtaining mechanical energy) and as sensors for pressure, position, contact, deformation and transducers of various types (in which mechanical energy is introduced to obtain electrical energy).

Their application in the generation of electrical energy is not so widespread, but there already exist pavements and floors walked on by pedestrians that transform the energy of their steps into usable electrical energy. There are proposals for clothing, footwear and even silicone implants that obtain energy from the movement of the body and use it to recharge portable electronic devices. They have been used for some time in electric arc lighters to produce the lighting spark in lighters, keyboards that recharge the device that they are included in with the user's keystrokes, etc. Similarly, there are designs for an electricity generator that intends to gather the pulsing and turbulent energy from the impact of waves or wind.

A second principle is the deliberate generation of turbulent vortices from a non-turbulent laminar flow. The 'Karman vortex street' was described by the Hungarian scientist Theodore von Karman in 1911, and its most used technological application is a specific type of flowmeter known as a vortex flowmeter, which measures the amount of fluid passing through a duct by counting the number of vortices formed inside it due to the presence of an element with a known geometry. The knowledge and modelling of this principle is also used in atmospheric and oceanic forecasting.

The third principle relates to the natural oscillation frequency of bodies. It is applied intentionally in the manufacture of musical instruments, loudspeakers, electronic devices (resonators), in some applications in microscopy ("tapping" in AFM, MRFM, and other microscopes, which have a cantilever that oscillates harmonically to improve the reading from the tip), etc. On the other hand, it is an effect that is avoided if possible in other technological areas, such as automotion and mechanics (Structural Acoustic Coupling Control) to reduce noise in engines, in brake pads, etc. It is also an undesired effect in architecture and large structures, such as smokestacks or bridges (as in the famous and exemplary case of the Tacoma Narrows bridge or the Ferrybridge Power Station cooling towers, where the aforementioned Karman vortices were also generated), etc.

No wind turbine generator device has been found which, in its geometry, intentionally seeks to synchronise the appearance of the turbulent vortices that appear throughout its structure.

No electrical generator has been found to date that purposely seeks the natural oscillation of bodies as an operational principle. None establishes in a controlled manner tuning or resonance of any type between their natural oscillation frequency and the frequency at which turbulent vortices are generated.

No electrical generator of those based on materials with electromechanical coupling has been found to date that uses as its primary energy source the energy contained in a stationary laminar airflow.

DESCRIPTION OF THE INVENTION

The vortex resonance wind turbine disclosed herein is a solution to the problems caused by conventional multi-blade wind turbines that have been described previously.

The vortex resonance wind turbine consists of a vertical, semirigid device anchored to the surface of the ground. The more visible part is a vertical block or mast which, as it has no moving parts (reducers, gears, axles, rotors, etc.) does not require lubrication or change of parts due to wear or fatigue. It is manufactured in part or in full using materials with a high electromechanical coupling.

Under certain wind conditions (speed, Reynolds number, etc.), the wind striking its surface causes a series of turbulent vortices or eddies downstream that transmit two types of force to its structure. One force, known as drag, is in the same direction as the wind and in case of laminar and stationary airflow causes a torsion fixed in time (non-usable force) and another force, known as lift, is perpendicular to the wind direction and the sense of which changes its sign alternately, maintaining its direction constant (usable force). If we have a laminar and stationary flow, the frequency with which this force changes sense due to the appearance of new vortices is described by Karman's formula:

$$Fv = \frac{S \cdot V}{h}$$

Where $F_v$ is the frequency of appearance of vortices, V is the air speed, h is the characteristic length of the geometry of the obstacle (for example the diameter for one with a circular cross section) and S is the adimensional Strouhal number for the fluid.

As with any solid element or structure, the device object of the invention has several spatial oscillation modes. For a mast anchored to the ground on one end, the first oscillation mode is that in which one end is static and the opposite end, the highest, has maximum amplitude. The value of its frequency is given by:

$$f_n = \frac{1}{2\pi} \cdot \sqrt{\frac{IE}{d_l} \cdot K_n^4 - a^2}$$

Where $f_n$ is the natural oscillation frequency for the nth harmonic, I is the sectional moment of inertia, E is the Young's modulus of the material, $d_l$ is the density of the bar per unit length, $K_n$ is the nth oscillation mode of the bar and a is a damping constant.

If the natural oscillation frequency of the mast $f_n$ is the same as the frequency $F_v$ at which it itself generates the vortices in the air, the structure and the turbulent regime will be in tune, and the assembly will resonate, thereby maximizing its capacity for energy absorption. This tuning of the natural oscillation frequency and the vortex generation frequency can be dangerous in certain structures such as bridges or smokestacks, but in our case it is the desired goal.

Materials with electromechanical coupling obtain a highly variable efficiency in the energy transformation process depending on the quality of the material. At present it is difficult to find materials with efficiency greater than 75% as there is always a significant amount of energy that is transformed into elastic potential energy. In the resonance case (when the material oscillates at its natural oscillation frequency) a substantial part of this elastic potential energy is recovered and the efficiency is closer to 100%. In this way, if in our case the mast or an object attached to it has pronounced electromechanical coupling (whether ferroelectric or piezoelectric), the transformation of mechanical energy into electrical energy is optimised.

As discussed above, the frequency of oscillation of a body depends on its density, its cross-sectional moment of inertia and its elastic rigidity constant or Young's modulus. As the frequency of appearance of the vortices depends on the air speed (which is not controlled and can vary over time), in order to tune or match the two frequencies (natural oscillation and vortex generation frequencies), it is possible to modify any of the control parameters on which the natural frequency of oscillation of the mast depends, and preferably to others the Young's modulus. This can be achieved by externally modulating the voltage to which are subjected the materials with electromechanical coupling that make them up. For this purpose, the vortex resonance wind turbine has an electronic unit meant to manage a control loop where the output is the value of the voltage to which are subjected the materials with electromechanical coupling and the input is the wind velocity. This value can be obtained by a standard wind gauge, or even better by using the stationary torsion of the wind turbine mast generated by the drag force. Another of its purposes is to filter and condition the energy generated by the device before it is supplied to the subsequent inversion and filtering stages that will allow it to be fed to the power grid.

The most natural location for the electronic control and regulation unit will be one where it does not interfere with the natural airflow.

Anchoring to the ground is established by a solid foundation or base of a typical binding agent such as concrete, cement, plaster, or mortar. It must be heavy and provide a firm and stable anchoring to the ground.

As stated above, the optimum operation of the vortex resonance wind turbine requires a laminar and stationary airflow to strike it. It is known that closeness to the ground produces turbulent regimes, so that a high mast is advisable. In addition, the energy contained in the wind is proportional to its speed to the power of 3. This results in the need to increase the height of the mast.

It is obvious that for a correct operation of the device, the mast must receive the lift forces in all of its segments (at any height) in a synchronised manner and thereby oscillate. Hellman's exponential law expresses the increase in speed with the distance from the ground:

$$V_z = V_h \cdot \left(\frac{z}{h}\right)^p$$

Where z is the height at which the air speed needs to be known, h is the height at which the air speed is known and $V_z$ and $V_h$ are respectively the unknown and known air speeds.

As the vortex generation frequency depends on air speed, Hellmann's exponential law and Karman's formula must be introduced in its geometry increasing its diameter as a function of the expected air speed, that is, adjusting its diameter with the height.

This new wind turbine system can be used in areas that can be exploited by conventional systems and, due to its characteristics, can be used in areas (urban and industrial) generally forbidden for traditional wind turbines.

Given its structural simplicity, the transport, storage and installation of the device is very simple, particularly when compared to installation requirements for conventional wind turbines. In fact, if the wind generation industry is currently capable of installing large turbines, there is no reason why with similar or fewer means it would not be possible to install vortex resonance wind turbines of equal or greater dimensions.

DESCRIPTION OF THE DRAWINGS

To complete the description being made and in order to aid a better understanding of the characteristics of the invention, according to an example of a preferred embodiment thereof, a set of drawings is enclosed forming an integral part of the description where, for purposes of illustration and in a non-limiting sense, the following is shown.

PREFERRED EMBODIMENT OF THE INVENTION

Figure 1:
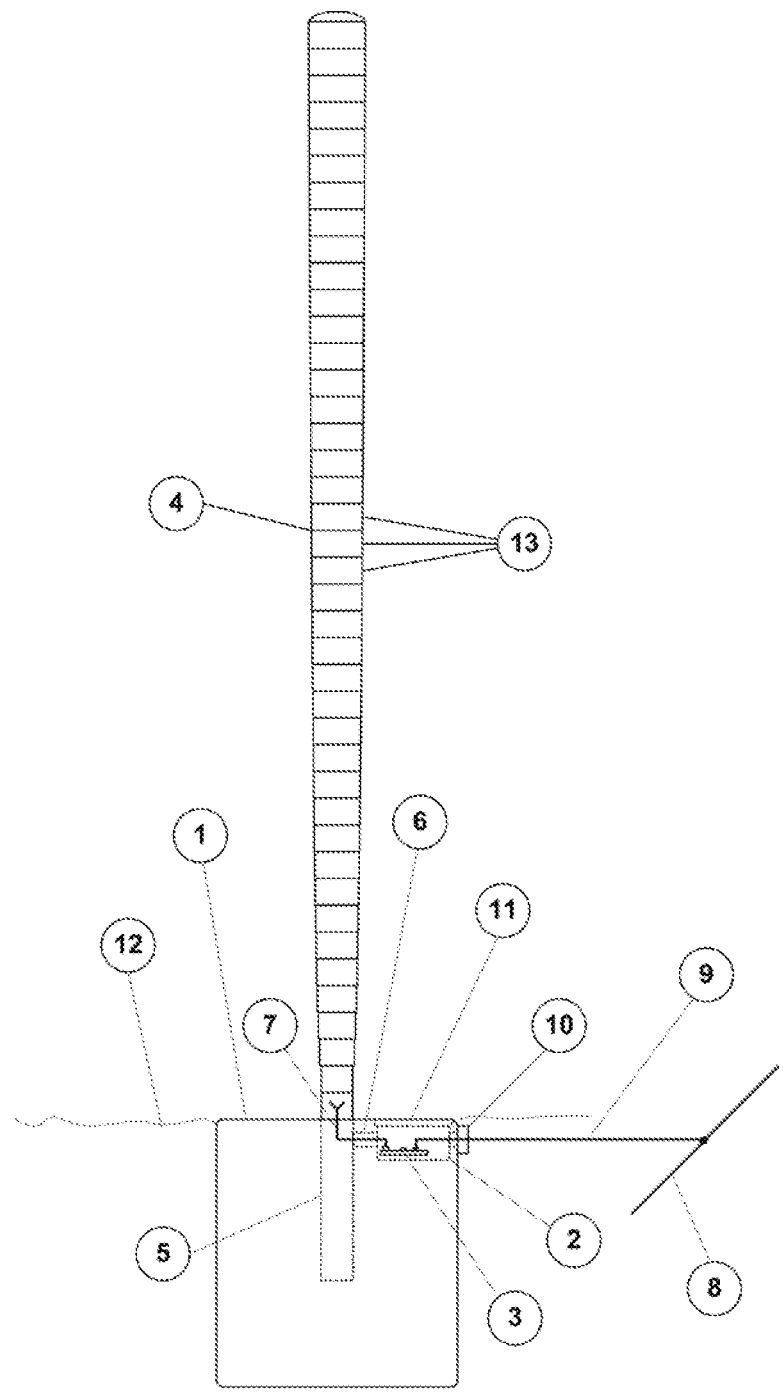
FIG. 1 shows a schematic representation of a cross-sectional elevation view corresponding to the vortex resonance wind turbine.

A preferred embodiment of the wind turbine object of the invention is described below with reference to the figures.

The vortex resonance wind turbine has no gears, bearings, etc., so that its assembly consists of placing the components that are physically connected in the described position and with physical or electrical contact between them.

A hole is made on the ground (12) large enough to receive the base (1) of cement or concrete, as in the foundations of any building or structure. The bottom of the mast (4) is attached to the base (1) at an anchoring area (5) allowing the higher part of the mast (4) to oscillate freely with no other constraint that the elasticity of the material. From an electrical point of view the mast (4), formed by elements with a high electromechanical coupling (13), is connected to the electronic unit for control and regulation (3) located in the sealed compartment (2) provided in the base (1) for this purpose. This connection is established by electrical conductors (7) introduced through a passage or duct (6) also made in the base (1). Connection to the power grid of the installation (8) is established with connection cables (9) that will be routed in a ditch made in the ground (12) and which leave the base (1) through sealed plugs (10). Access to the sealed compartment (2) is gained through a cover (11) that provides access to its interior and allows assembly and maintenance actions to be carried out.

Figure 2:
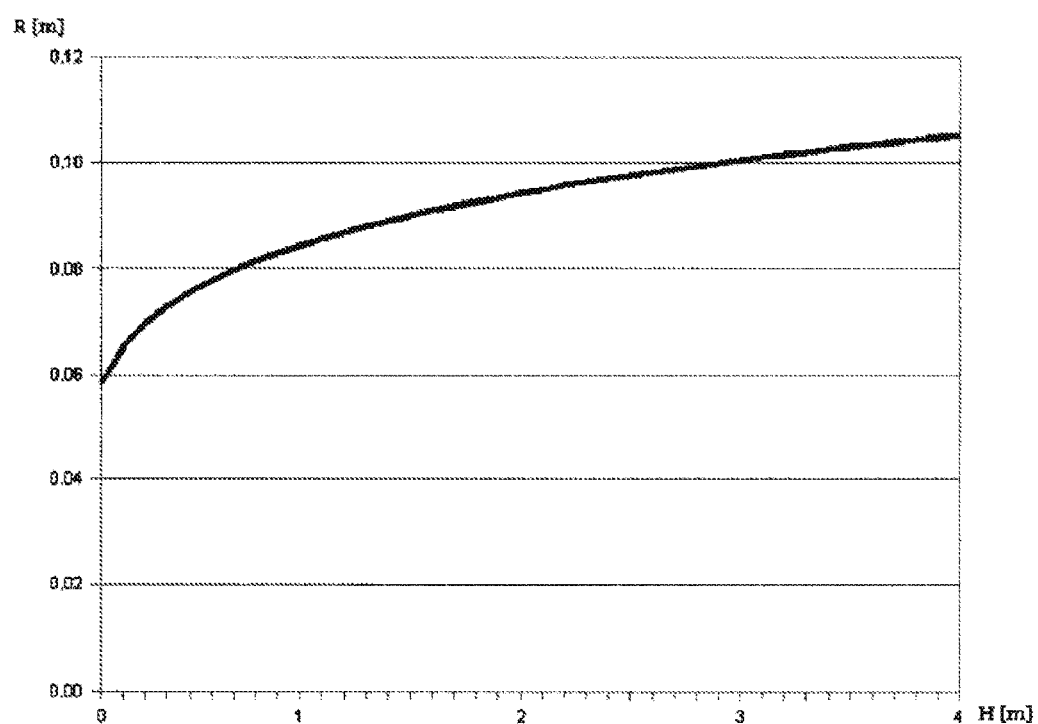
FIG. 2 shows a graph representing, by way of example, the variation in the thickness of the mast with its height (according to Hellmann's exponential law and Karman's formula). As in this case the cross section is circular, the radius R in meters is specified versus the height H, also in meters.
Figure 3:
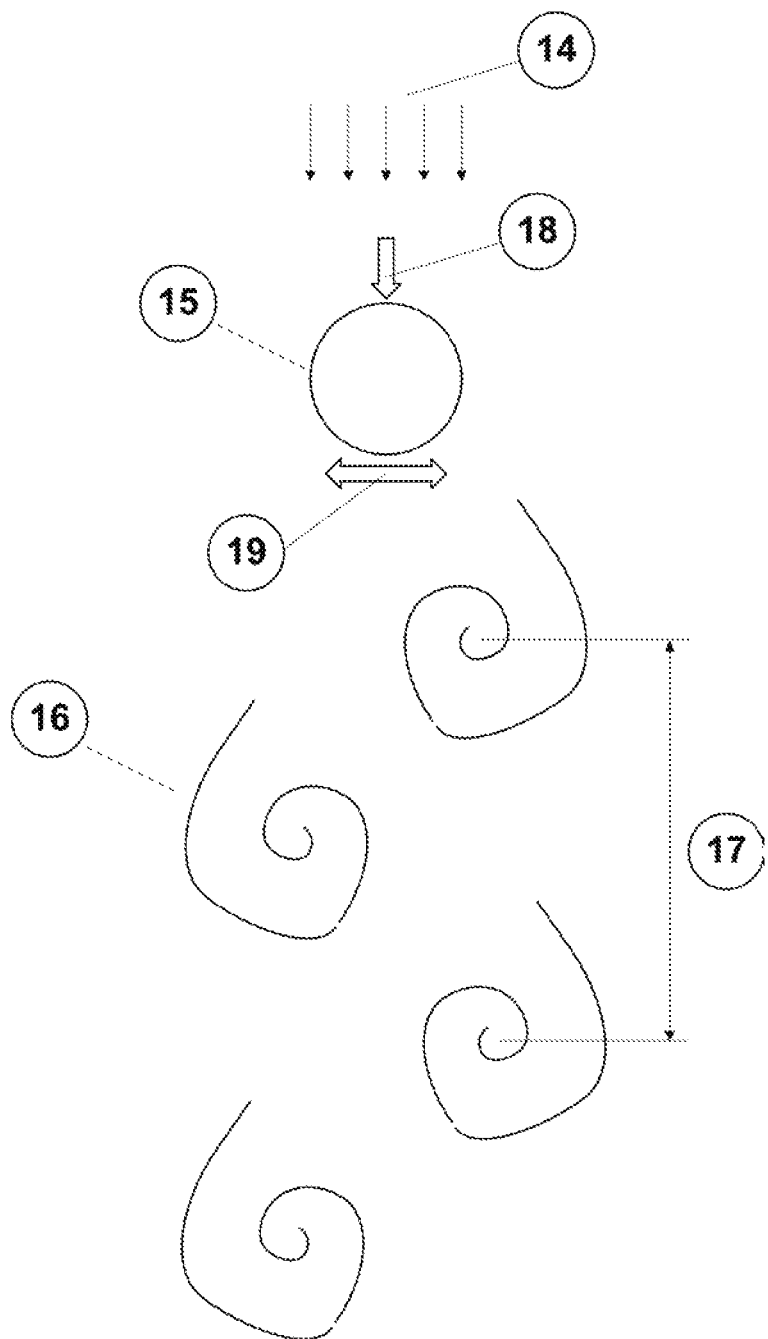
FIG. 3 shows a schematic representation of the "Karman vortex street" and the forces due to this effect on the surface that generates it.

To define dimensional aspects and considering that the mast (4) has a circular cross section (15) to avoid depending on wind direction and a variable radius R as a function of the height H, FIG. 2 shows a graph indicating that for a mast with a height of 4 meters and a desired natural oscillation frequency, for example, of 8 Hertz (determined among other factors by the Young's modulus of the material with which it is made), the cross section (15) changes from a radius of 82.9 mm at a height of 1 meter from the ground (12) to 105.3 mm at 4 meters. This geometry produces a synchronised appearance of vortices along the entire length of the mast (4) for a wind governed by a Hellman's exponential coefficient of p=0.16 and a mean air speed of 6.5 m/s at a height of 10 meters.

As regards the fluid, the laminar and stationary wind (14) strikes the mast (4) producing a drag force (18) that cannot be used and a lift force (19) with a sense and magnitude that changes over time. Any of the possible circular cross sections (15) of the mast (4) with a plane perpendicular to its main axis will generate a series of alternating vortices (16) which, in the stationary case, travel between them at a constant distance (17). The lift forces (19) are caused by these vortices (16). If the wind direction changes, the control and regulation unit (3) will actively modulate the Young's modulus of the mast (4), changing the electrical voltage affecting the elements with a high electromechanical coupling (13) that conform it, thereby tuning its natural oscillation frequency with the appearance of the vortices (16).

The power grid of the installation (8) receives the energy supplied by one or more vortex resonance wind turbines and can be equipotential (direct current). It is in charge of sending all this energy to an electrical substation that will transform and condition it according to the requirements of the utility company or station received said electrical energy.

There are only a few requirements for the distribution of the wind turbines on the ground. In addition to a correct anchoring to the ground, the aerodynamic interference between them must be minimised, separating them to improve their efficiency.

To reduce their visual impact, the vortex resonance wind turbines can have a colour that makes them blend in with the surroundings, although in a preferred embodiment refractory paint (white, silver, etc.) is used to reduce the degradation caused by sunlight.

What is claimed is:

1. A vortex resonance wind power generator, comprising:
a mast for capturing wind energy, the mast having one end attached to a base and a higher part capable of oscillating freely, the mast being arranged so that stationary and laminar airflow striking the mast is transformed into a turbulent flow, forming vortices or eddies,
the mast having a cross section with a characteristic dimension that increases in a longitudinal direction as a function of the height, to produce a synchronized appearance of vortices along the mast.

2. The vortex resonance wind power generator according to claim 1, wherein the mast has a circular cross section with a diameter, the characteristic dimension being the diameter.

3. The vortex resonance wind power generator according to claim 2, further comprising means for modulating the natural frequency of oscillation of the mast to match or tune it to the frequency of appearance of vortices.

4. The vortex resonance wind power generator according to claim 2, wherein at an upper end of the mast, the diameter decreases in the longitudinal direction toward a top of the mast, as a function of the height thereof.

5. The vortex resonance wind power generator according to claim 2, wherein the diameter increases in the longitudinal direction so that the vortices or eddies appear in a synchronized manner along the entire length of the mast.

6. The vortex resonance wind power generator according to claim 2, wherein the diameter increases in a non-linear manner as a function of the height.

7. The vortex resonance wind power generator according to claim 1, wherein the mast has a height of more than 1 meter.

8. The vortex resonance wind power generator according to claim 7, further comprising means for modulating the natural frequency of oscillation of the mast to match or tune it to the frequency of appearance of vortices.

9. The vortex resonance wind power generator according to claim 1, wherein the mast has a height of more than 4 meters.

10. The vortex resonance wind power generator according to claim 1, further comprising means for modulating the natural frequency of oscillation of the mast to match or tune it to the frequency of appearance of vortices.

11. The vortex resonance wind power generator according to claim 1, wherein the characteristic dimension increases in the longitudinal direction from a bottom of the mast toward a top of the mast, as a function of the height thereof.

12. The vortex resonance wind power generator according to claim 1, wherein at an upper end of the mast, the characteristic dimension decreases in the longitudinal direction toward a top of the mast, as a function of the height thereof.

13. The vortex resonance wind power generator according to claim 1, wherein the characteristic dimension increases in the longitudinal direction so that the vortices or eddies appear in a synchronized manner along the entire length of the mast.

14. The vortex resonance wind power generator according to claim 1, wherein the mast comprises elements with a high electromechanical coupling for producing electrical energy out of the oscillating movement of the mast.

15. The vortex resonance wind power generator according to claim 1, wherein the mast comprises elements with a high electromechanical coupling for adapting the natural frequency of oscillation of the mast.

16. The vortex resonance wind power generator according to claim 1, wherein the characteristic dimension increases in a non-linear manner as a function of the height.

17. A method of producing electrical energy with a mast having one end attached to a base and an opposite end capable of oscillating freely, comprising:

subjecting the mast to wind so that vortices or eddies appear with a frequency, causing the mast to oscillate; and adapting the natural frequency of oscillation of the mast to wind speed so that the natural frequency of oscillation of the mast matches the frequency of appearance of the vortices.

18. The method according to claim 17, wherein adapting the natural frequency of oscillation of the mast to the wind speed comprises modulating the Young's modulus of the mast.

19. The method according to claim 17, wherein a characteristic dimension of the cross section of the mast increases in a longitudinal direction as a function of the height, so that the vortices or eddies appear in a synchronized manner along the entire length of the mast.

20. The method according to claim 19, wherein the mast has a circular cross section, the characteristic dimension being the diameter of the mast.

* * * * *